UNITED STATES PATENT OFFICE.

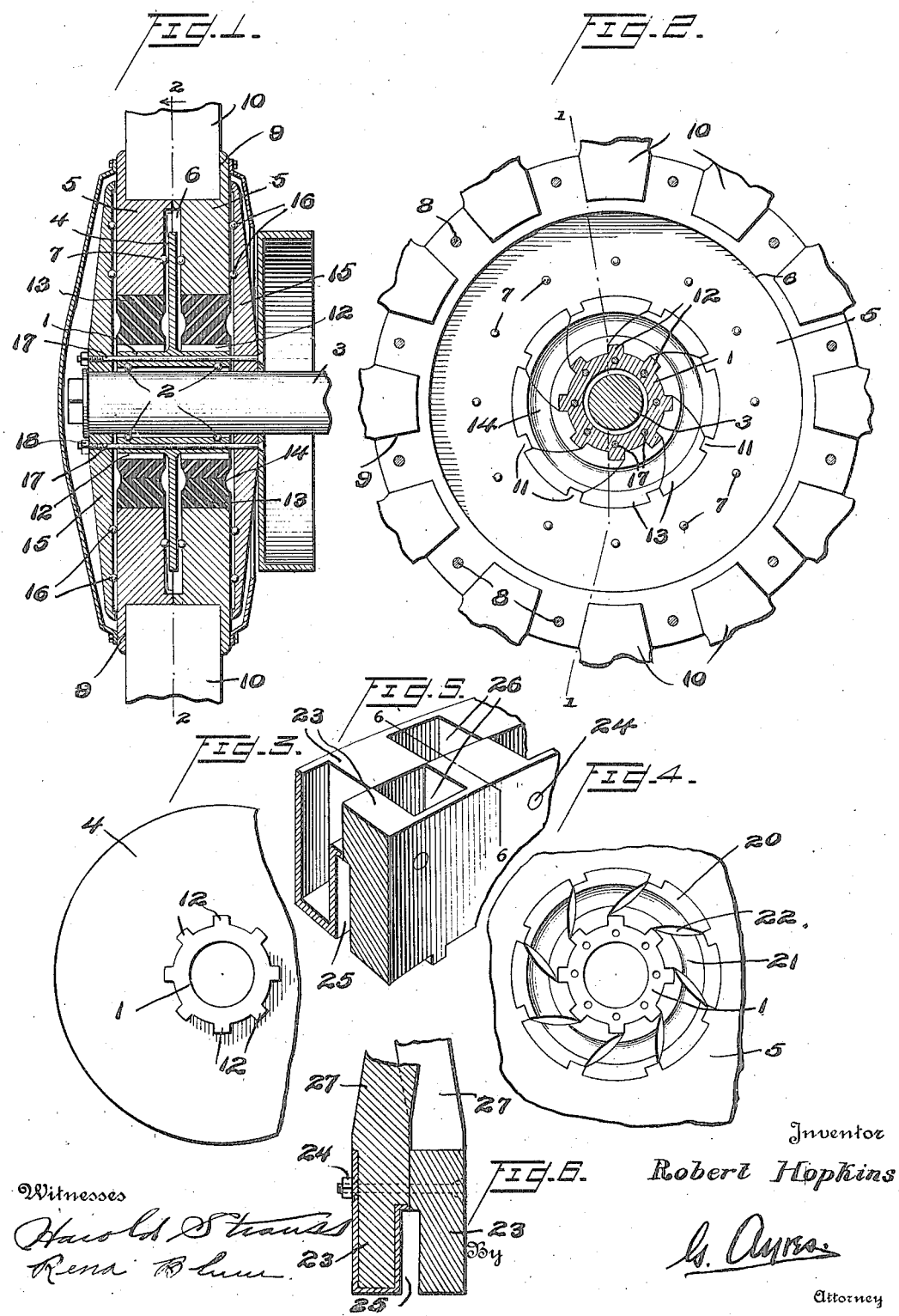

ROBERT HOPKINS, OF SHEFFIELD, ALABAMA, ASSIGNOR OF ONE-HALF TO A. G. WEIDENSEE, OF SHEFFIELD, ALABAMA.

VEHICLE-WHEEL.

1,185,097.	Specification of Letters Patent.	Patented May 30, 1916.

Application filed March 16, 1915. Serial No. 14,794.

*To all whom it may concern:*

Be it known that I, ROBERT HOPKINS, a citizen of the United States, residing at Sheffield, in the county of Colbert and State of Alabama, have invented certain new and useful Improvements in Vehicle-Wheels, of which the following is a specification.

My invention relates to an improved vehicle wheel, and it consists in the constructions, combinations, and arrangements herein described and claimed.

An object of my invention is to provide an improved vehicle wheel of the cushion hub type, adapted to eliminate all the excessive and disagreeable shocks transmitted to the vehicle axle in previous constructions.

A further object of my invention is to provide a strong and durable vehicle wheel of the cushion hub type, adapted to operate with minimum of friction and binding strains under all practical conditions.

In the accompanying drawing: Figure 1 is a transverse section of a wheel on the line 1—1 of Fig. 2, illustrating one embodiment of my invention; Fig. 2 is a section on the line 2—2 of Fig. 1; Fig. 3 is a fragmentary side view of the hub box and its thrust disk; Fig. 4 is a detail view, showing a slightly modified form of cushioning members; Fig. 5 is a fragmentary perspective view illustrating a modified form of hub casing, and Fig. 6 is a detail section on the line 6—6 of Fig. 5, with the inner ends of the wheel spokes shown in position.

Figs. 1–3 illustrate one embodiment of my invention, in which the hub box 1 is shown mounted on ball bearings 2 of the vehicle axle 3, and provided medially with a thrust disk, or member 4.

A hub casing 5 is spaced concentrically about the hub box 1 and provided with an annular recess 6 for receiving the thrust disk 4, ball bearings 7 being preferably provided between the radial walls of said thrust disk and recess. The hub casing is shown comprising a pair of duplicate annular members secured together by bolts 8 and provided on their adjacent faces with registering recesses 9 for clamping the inner ends of the wheel spokes 10.

The inner periphery of the hub casing is provided with sets of driving lugs 11 extending axially at the opposite sides of the central annular recess 6, and the opposed outer periphery of the hub box 1 is provided with similar coöperating sets of driving lugs 12 spaced axially at both sides of the medial thrust disk 4. Independent annular series of cushioning members 13 are confined between the hub box and casing at the respective sides of the thrust disk 4, and provided with recesses for receiving the driving lugs 11 and 12 on said box and casing.

The cushioning members 13 may be formed of rubber, composition, or any suitable material, and are preferably provided with reduced, or recessed, portions. If desired, the annular series of cushioning members may comprise members having different resiliency and cushioning action; as by forming said members of different compositions of rubber or other materials.

A pair of confining plates 15 is rotatably mounted on the axle 3, and slightly spaced from the ends of the hub box 1, in engagement with ball bearings 16 on the adjacent outer faces of the hub casing 5. A series of bolts 17 extend through the hub box 1 and through both of said confining plates 15: said bolts being provided with nuts 18, and constituting a common means for simultaneously adjusting both of said side plates 15 axially to insure an equal bearing pressure thereof on the respective sides of said hub casing. This provides an improved construction, in which the bearing plates 15 and their clamping bolts 17 have a slight axial movement relative to the hub box, thereby permitting simultaneous adjustment of said plates to cause equal pressure thereof on the respective sides of the hub casing, without forcing said casing axially to produce unequal bearing pressures of the radial walls of the casing recess 6 against the respective sides of the thrust disk 4. The hub casing is normally held against axial shifting by its free bearing engagement with the central thrust disk 4, but slight axial shifting of said casing and its confining plates 15 under conditions of abnormal strain or wear will bring one of said plates into engagement with the adjacent end of the hub box and cause the other of said plates to be rigidly held by the bolts 17 against further axial displacement and thus provides a firm additional thrust bearing for the hub casing; whereby axial strains on the hub casing will be distributed to said additional thrust bearing and the central thrust disk 4, and excessive and destructive strains on said disk will be efficiently prevented. Where my invention is used as a driving wheel for an automobile vehicle, a brake drum 19 can be secured to one of the confining plates 15 by said bolts 17, as shown in Fig. 1.

From the above description, it will be understood, that my invention provides an improved vehicle wheel, in which the simultaneously adjustable side confining plates insure an equal and uniform bearing pressure between the hub casing and thrust disk, which latter extends radially in the medial plane of the wheel rim, or tread, between the two axially spaced annular series of cushioning members: thereby providing a highly advantageous construction adapted to operate efficiently with a minimum of friction and binding strains.

Fig. 4 illustrates a slight modification in which, the annular series of overlapping cushioning members 20 are provided on their radial faces with annular recesses 21 of arc-shaped cross section, and with additional recesses to provide openings 22 between their several abutting faces: thereby providing an improved construction in which the cushioning action of the annular series of members will increase rapidly upon an augmentation of the forces acting on the wheel.

Figs. 5-6 illustrate a modified construction of the hub casing, comprising a pair of duplicate members 23 provided with a central recess 25 for receiving the thrust disk, and with series of recesses 26 for receiving the inner ends of the wheel spokes 27: said members 23 being secured together by bolts 24 with their recesses 26 arranged in staggered relation, for firmly clamping the inner ends of said spokes 27. This provides a very strong and advantageous construction for permitting close spacing of the inner ends of the wheel spokes in the hub casing.

I have illustrated and described preferred and satisfactory constructions, but changes could be made within the spirit and scope of my invention.

I claim:

1. In a vehicle wheel, a hub box provided with a thrust disk, a hub casing provided with an annular recess for receiving said disk, cushioning members between said hub box and casing, a pair of confining plates spaced axially from the respective ends of said hub box, and a common means for axially adjusting said pair of confining plates in bearing engagement with said hub casing.

2. In a vehicle wheel, a hub box provided with a thrust disk, a hub casing provided with an annular recess for receiving said disk, a pair of confining plates spaced axially from the respective ends of said hub box, means connecting said pair of confining plates for simultaneously adjusting the latter axially with equal bearing pressures on the respective sides of said hub casing, and cushioning members between said hub box and casing.

3. In a vehicle wheel, a hub box provided with a thrust disk, a hub casing provided with an annular recess for receiving said disk, a pair of confining plates spaced axially from the respective ends of said hub box, bolts extending axially through said hub box and confining plates for clamping the latter in bearing engagement with said hub casing, and cushioning members between said hub box and casing.

In testimony whereof I affix my signature in presence of two witnesses.

ROBERT HOPKINS.

Witnesses:
G. H. WOODWARD,
R. E. WHITAKER.